United States Patent [19]

Aoki et al.

[11] Patent Number: 4,952,021

[45] Date of Patent: Aug. 28, 1990

[54] PRESSURE TRANSPORTING SYSTEM

[75] Inventors: Tetsuji Aoki; Bang Lin; Yoshiaki Terasawa, all of Kanagawa, Japan

[73] Assignee: Sumitomo Electric Industries Ltd., Osaka, Japan

[21] Appl. No.: 349,998

[22] Filed: May 10, 1989

[30] Foreign Application Priority Data

May 18, 1988 [JP] Japan .................................. 63-121496
Mar. 8, 1989 [JP] Japan ..................................... 1-55791
Mar. 8, 1989 [JP] Japan ..................................... 1-55792

[51] Int. Cl.⁵ ................................................ G02B 6/44
[52] U.S. Cl. ................................................... 350/96.23
[58] Field of Search ...................................... 350/96.23

[56] References Cited

U.S. PATENT DOCUMENTS

| | | | |
|---|---|---|---|
| 4,072,398 | 2/1978 | Larsen et al. | 350/96.23 |
| 4,550,976 | 11/1985 | Cooper et al. | 350/96.23 |
| 4,699,459 | 10/1987 | Priaroggra | 350/96.23 X |
| 4,711,523 | 12/1987 | Iri et al. | 350/96.23 |
| 4,822,132 | 4/1989 | Oestreich | 350/96.23 |

Primary Examiner—Frank Gonzalez
Assistant Examiner—Phan T. Heartney
Attorney, Agent, or Firm—Cushman, Darby & Cushman

[57] ABSTRACT

An optical fiber cable incorporating either a lubricant or an antistatic agent or both in the outermost layer of the optical fiber unit; incorporating a lubricant or an antistatic agent or both in the pipe; and incorporating a lubricant or an antistatic agent or both in both the outermost layer of the optical fiber unit and the pipe.

44 Claims, 1 Drawing Sheet

PRESSURE TRANSPORTING SYSTEM

BACKGROUND OF THE INVENTION

The present invention relates generally to a pressure transporting system, in which an elongated body is transported within an elongated hole by blowing with a pressurized gas. More particularly, the present invention relates to an optical fiber cable construction adapted for laying by blowing with a pressurized gas, in which an optical fiber unit consisting of one or more optical fibers wrapped with a foamed coating layer is transported within a pipe formed of polymer or the like by blowing with a pressurized gas.

While various methods have been employed to lay out optical fiber cables, it has recently been proposed that one or more optical fibers be laid within so-called a pipe cable, i.e. an assembly of polymer pipes, by blowing with a pressurized gas such as air or the like, and the pipe cable being then laid. An example of this method is disclosed in GB patent applications Nos. 8231840 and 8309671. The method of laying optical fiber cables by blowing with pressurized gas has several advantages: no external forces such as tension will be exerted upon the optical fiber so that it will not be damaged during laying; since existing polymer pipes can be used, laying out in complicated routes is possible; fiber replacement and cable extension or connection can readily be achieved; maintenance is therefore easy and installation cost is relatively low.

FIGS. 1A, 1B and 1C show the cross-sectional structures of conventional optical fiber cables designed to be laid by blowing with pressurized gas. FIG. 1A shows an optical fiber unit 20 consisting of an assembly of seven bare or coated optical fibers 21 that are surrounded with a filled layer 24 and a foamed coating layer 22. FIG. 1B shows an optical fiber cable 201 having the optical fiber unit 20 blown into a pipe 23 under pressure. FIG. 1C shows a pipe cable 200 having an assembly of seven optical fiber cables 201 encased in an outer sheath 25.

The foamed coating layer 22 is an outer layer on the optical fiber unit 20 and is typically made of a foamed polymer, particularly, a polyethylene foam, in order to satisfy design considerations for lightweightness and large resistance to wind pressure.

The optical fiber unit 20 is to be inserted into the polymer pipe 23 which is typically made of polymer, for example, polyethylene.

Even if uniformity in the outside diameter of the optical fiber unit, uniformity in the shaping of the pipe, and optimization of the optical fiber unit diameter with respect to the inside diameter of the pipe are attained, the conventional fiber cable laying system has not been completely satisfactory not only in terms of ultimate blowing distance and speed that are achieved when the optical fiber unit is laid by blowing into the pipe but also with respect to the system configuration of a transmission network and the cost expended in cable installation. Further, the conventional optical fiber cable laying system cannot lay a very long optical fiber unit in a pipe, that is, an optical fiber unit has to be connected to the other units in order to lay the fiber cable at a long distance. In order to deal with these problems, the present inventors conducted various studies and found that the coefficient of friction between optical fiber unit and pipe and the static electricity occurring between them are two principal factors that deteriorates the effects mentioned above.

SUMMARY OF THE INVENTION

An object, therefore, of the present invention is to provide an optical fiber cable that is suitable for accommodation by blowing with pressurized gas and which is capable of reducing the friction and static electricity that would be generated between an optical fiber unit and the surrounding pipe.

It is another object of the present invention to provide an optical fiber cable which can be laid at a long distance at one time without connecting a plurality of optical fiber units.

The above and other objects of the present invention can be attained by the provision of an optical fiber cable in which, according to the invention, building block is the combination of an optical fiber unit consisting of one or more bare or coated optical fibers coated with a foam layer, optionally with an intervening filled layer disposed, and a polymer pipe in which said optical fiber unit is confined by blowing with a pressurized gas.

More specifically, the object of the present invention is achieved by furnishing either the optical fiber unit or the polymer pipe or both with a structure for reducing friction to the insertion of the optical fiber unit into the polymer pipe by blowing with a pressurized gas.

An effective structure for reducing the insertion friction may be one of the following: incorporating either a lubricant or an antistatic agent or both in the outermost layer of the optical fiber unit; incorporating a lubricant or an antistatic agent or both in the pipe; and incorporating a lubricant or an antistatic agent or both in both the outermost layer of the optical fiber unit and the pipe. An effective lubricant is a solid lubricant or an organic lubricant. The pipe may preferably be formed of polymer.

In accordance with the present invention, either a lubricant or an antistatic agent or both are incorporated in either the optical fiber unit in an optical fiber cable or the pipe in which said fiber unit is confined by blowing with a pressurized gas or both. On account of this structure, the blowing characteristics associated with laying of the overall system which consists of the optical fiber unit and the pipe are remarkably improved.

DESCRIPTION OF THE PREFERRED EMBODIMENTS

Figure 1A:
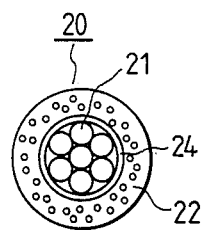
FIG. 1A is a cross section of a conventional optical fiber unit.
Figure 1B:
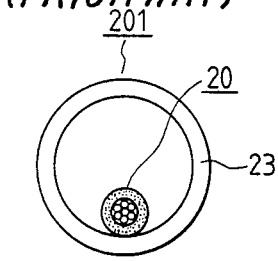
FIG. 1B is a cross section of an optical fiber cable accommodating the fiber unit shown in FIG. 1A.
Figure 1C:
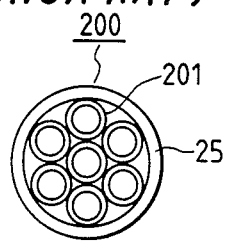
FIG. 1C is a cross section of a pipe cable accommodating a plurality of the fiber cables shown in FIG. 1B.
Figure 2:
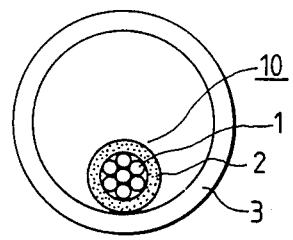
FIG. 2 is a cross section of an optical fiber cable according to an embodiment of the present invention.

Preferred embodiments of the present invention are described below with reference to FIG. 2, which shows a cross section of an optical fiber cable according to an embodiment of the present invention.

In the example shown, an assembly of seven stranded bare or coated optical fibers 1 is coated on its periphery with a foamed coating layer 2 containing a friction reducing agent and the resulting optical fiber unit 10 is blown and confined in a polymer pipe 3 that also contains a friction reducing agent.

A friction reducing agent may be incorporated in both the optical fiber unit and the polymer pipe. However, this is not necessarily required since the effectiveness of a friction reducing agent is relative and will be exhibited as long as it is contained in either component. If a friction reducing agent is incorporated in at least one of the optical fiber unit and the polymer pipe, the optical fiber cable as a whole contains a friction reducing agent and its blowing characteristics associated with blowing and confinement of the optical fiber unit in the polymer pipe are significantly improved.

The friction reducing agent to be used in the optical fiber cable of the present invention may be a lubricant which serves to eliminate or reduce the effects of friction between the optical fiber unit and the polymer pipe, or an antistatic agent which serves to eliminate the effects of static electricity occurring between these two components. When an antistatic agent is to be used, it would be particularly effective to incorporate it in both the optical fiber unit and the polymer pipe.

Illustrative lubricants that can be used in the present invention include: fatty acid such as stearic acid; aliphatic amides such as oleamide, erucamide and stearamide; inorganic solid lubricants such as carbon, boron nitride, talc and molybdenum disulfide; fluorine resin based solid lubricants such as polytetrafluoroethylene (PTFE) powder; and silicone based plastic additives having a reactive polyorganosiloxane grafted onto polyethylene or a like polymer. Among these lubricants, solid lubricants and silicone based plastic additives are particularly suitable for prolonged use in a hot and humid climate since they are not likely to induce mold growth.

Other lubricants that may be used in the present invention are organics including fatty acid esters (e.g. butyl stearate and ethylene glycol monostearate) and metal soaps (e.g. lead stearate).

The lubricants listed above will exhibit their effect by blooming out to the surface of either the polymer pipe or the optical fiber unit or both. Thus, the amount in which these lubricants are incorporated will influence the extent of lubrication of the surface of these components.

Antistatic agents that can be employed in the present invention may be based on siloxanes or surfactants. Particularly effective surfactant-based antistatic agents are nonionic polyhydric alcohol fatty acid esters of and glycerol aliphatic acid esters.

Several of the lubricants described above were incorporated in an amount of 10 wt % (0.5 wt % in case of oleamide) in low-density polyethylene and sheets were produced from the mixtures. The coefficient of static friction between sheets was measured for each specimen and the results are shown in Table 1 below. The data in Table 1 were obtained after heat treatment was conducted at 60° C. for 3 days to eliminate any effect that might be caused by the surface blooming of lubricant.

The eight sheets a–h (see Table 1) were worked into pipes having an inside diameter of 6 mm$\phi$ and an outside diameter of 8 mm$\phi$. These samples of "polymer pipe" were identified as Samples A–H.

TABLE 1

| Sheet | Lubricants | Static friction |
|---|---|---|
| a | absent | 0.30 |
| b | stearic acid | 0.19 |
| c | oleamide | 0.15 |
| d | ethylene glycol monostearate | 0.20 |
| e | lead stearate | 0.20 |
| f | boron nitride | 0.20 |
| g | PTFE powder | 0.23 |
| h | silicone based plastic additive | 0.18 |

Seven optical fibers each coated with a UV curable urethane acrylate polymer to an outside diameter of 0.25 mm$\phi$ were assembled and coated with a solid layer of nylon-12 (Ny-12) to an outside diameter of 1.0 mm$\phi$. The filled layer was further coated with an about 50% foamed low density polyethylene (LDPE) layer to a final outside diameter of 2.0 mm$\phi$ according to two formulations, one containing 0.5 wt % of oleamide as a lubricant in accordance with the present invention and the other containing no such lubricant. Optical fiber unit Sample No. 1 was fabricated using the first formulation, and Sample No. 2 using the second formulation.

EXAMPLE 1

Each of the polymer pipe Samples A–H which were 500 m long was wound neatly around a drum having a barrel diameter of 1 m$\phi$ and each of the optical fiber unit Samples No. 1 and No. 2 was blown under pressure into the respective polymer pipes. The time required for the fiber units to be completely accommodated in the polymer pipes was measured with air compressed to 5.0 kg/cm$^2$ being supplied as a blow gas. The results are shown in Table 2 below.

TABLE 2

| | Polymer pipe | Optical fiber unit | |
|---|---|---|---|
| | | Sample 1 (with additive) | Sample 2 (without additive) |
| Sample | Additive | (min.) | (min.) |
| A | absent | 24 | 30 |
| B | stearic acid | 20 | 25 |
| C | oleamide | 16 | 21 |
| D | ethylene glycol monostearate | 19 | 23 |
| E | lead stearate | 19 | 25 |
| F | boron nitride | 20 | 25 |
| G | PTFE powder | 18 | 22 |
| H | silicone based plastic particles | 20 | 24 |

Tables 1 and 2 show the pronounced relationship between static friction coefficient and blowing characteristics. Remarkable improvement in blowing characteristics can be accomplished by incorporating a lubricant in either the polymer pipe or the optical fiber or both.

EXAMPLE 2

The stability with time of blowing characteristics was investigated on Sample G using 10 wt % PTFE powder as a solid lubricant for polymer pipe and Sample C using oleamide as a lubricant. As in Example 1, each of these polymer pipes was wound neatly around a drum having a barrel diameter of 1 m$\phi$, and optical fiber unit Sample No. 2 containing no lubricant was blown under pressure into each polymer pipe sample with compressed air (5.0 kg/cm²) being supplied as blow gas. The time required for the fiber unit to be completely accommodated in the polymer pipes was measured both initially and after heat treatment at 100° C. for 2 months. The results are shown in Table 3 below.

TABLE 3

| Polymer pipe | | Optical fiber unit (Sample No. 2) blowing time (min.) | |
|---|---|---|---|
| Sample | Additive | Initial | After heating at 100° C. for 2 mnts |
| G | PTFE powder | 22 | 24 |
| C | oleanimde | 21 | 35 |

As is clear from Table 3, polymer pipe Sample G incorporating a solid lubricant exhibited high thermal stability in blowing characteristics.

EXAMPLE 3

The effectiveness of an antistatic agent was investigated in this example using polymer pipe Sample I (i.d. 6 mmφ and o.d. 8 mmφ) containing 0.3 wt % glycerol fatty acid ester and optical fiber unit Sample No. 3 that was of the same structure and dimensions as Sample Nos. 1 and 2 which contained 0.3 wt % glycerol fatty acid ester in its outermost layer.

The time required for the fiber unit to be accommodated in the polymer pipe was measured with air compressed to 5.0 kg/cm² being supplied as blow gas. For comparison, similar measurements were conducted on polymer pipe Sample A and optical fiber unit Sample No. 2, neither of which contained an additive. The results are shown in Table 4 below together with the data for the combination of polymer pipe I and fiber unit Sample No. 3.

The method of evaluating blowing characteristics was the same as in Example 1; the polymer pipe 500 m long was wound around drum having a barrel diameter of 1 mφ and each of the fiber unit samples was blown under pressure into the wound polymer pipe.

TABLE 4

| Polymer pipe | | Optical fiber unit blowing time (min.) | |
|---|---|---|---|
| Sample | Additive | Sample No. 3 (with additive) | Sample No. 2 (without additive) |
| A | absent | 25 | 30 |
| I | glycerol fatty acid ester | 23 | 28 |

As is clear from the data in Table 4, blowing characteristics can be improved by incorporating an antistatic agent either in the polymer pipe or in the outermost layer of the optical fiber unit or in both.

The lubricants tested in the experiments will exhibit their effectiveness by blooming out to the surface of either the polymer pipe or the optical fiber unit or both; thus, the smaller the molecular weight of the lubricant and the more mobile it is, the more rapid will it be in exhibiting its effect after production.

If the lubricant to be used has a large molecular weight and is less mobile, it will be effective to perform thermal aging or some other treatment for the purpose of allowing the lubricant to bloom out to the surface of the lubricant loaded polymer pipe or optical fiber unit.

Some of the lubricants described above will develop stickiness if they bloom out in excessive amounts to the surface of the lubricant loaded polymer pipe or optical fiber unit. It would be thus effective to select the appropriate lubricant and amount of addition on the basis of evaluation of frictional coefficient and investigation of the amount in which the lubricant will bloom out considering the temperature of the environment in which it is to be used. For example, oleamide whose melting point is about 20°-30° C. higher than room temperature is suitable for use at room temperature in view of the time required for it to exhibit the lubricating effect and in consideration of the stability of that effect. For use at elevated temperatures, it would be preferable to use lubricants of higher molecular weight such as behenic acid derivatives.

EXAMPLE 4

An experiment was conducted to investigate the effectiveness of incorporating both a lubricant and an antistatic agent. The optical fiber unit under test was Sample No. 4 which was of the same construction and dimensions as fiber unit Sample Nos. 1-3 and which was coated with a foam layer containing 0.5 wt % lubricant (oleamide) and 0.3 wt % antistatic agent (glycerol fatty acid ester). As comparison, optical fiber unit Sample No. 2 (without additive) was tested.

As a polymer pipe into which these optical fiber units were to be blown for accommodation, an about 50% foamed low density polyethylene (LDPE) pipe (Sample J) having an inside diameter of 6 mmφ and an outside diameter of 8 mmφ was fabricated by incorporating 0.5 wt % lubricant (oleamide) and 0.3 wt % antistatic agent (glycerol fatty acid ester). LDPE pipe Sample A containing no additive was compared with pipe Sample J.

Each of the LDPE pipe Samples (J and A) 500 m long was wound neatly around a drum having a barrel diameter of 1 mφ. An experiment of blowing with pressurized gas was conducted on combinations of these LDPE pipe Samples J and A with optical fiber unit Sample Nos. 4 and 2. In the experiment, the time required for the optical fiber units to be completely accommodated in the LDPE pipes by means of blowing with compressed (5.0 kg/cm²) air, as well as the blowing speed were measured. The results are shown in Table 5 below.

TABLE 5

| | LDPE pipe | | |
|---|---|---|---|
| Optical fiber unit | Sample J with additive | Sample A without additive | Parameter |
| Sample 4 with additive | 15 min 25 m/min | 22 min 18 m/min | blowing time blow speed |
| Sample 2 without additive | 20 min 20 m/min | 30 min 15 m/min | blowing time blow speed |

EXAMPLE 5

Using the same combinations of optical fiber unit Samples 4 and 2 with LDPE pipe Samples J and A, characteristics of blowing through pipes with compressed (5.0 kg/cm²) air were evaluated in terms of blowing distance and time. The results are shown in Table 6.

TABLE 6

| Optical fiber unit | LDPE pipe | Blowing characteristics | |
|---|---|---|---|
| | | distance | time |
| Sample 4 (with additive) | Sample J (with additive) | 1.500 m | 60 min |
| Sample 2 | Sample A | 800 m | more than |

TABLE 6-continued

| Optical fiber unit | LDPE pipe | Blowing characteristics | |
|---|---|---|---|
| | | distance | time |
| (without additive) | (without additive) | | 80 min |

The data in Tables 5 and 6 show that the optical fiber cable constructed in accordance with the present invention successfully reduces the adverse effects that would otherwise occur during blowing through the polymer pipe on account of friction and static electricity between the pipe and the optical fiber unit, and hence is effective in providing improved blowing characteristics as regards blowing distance and time.

As described on the foregoing pages, the optical fiber cable of the present invention which is constructed by blowing an optical fiber unit into a polymer pipe with pressurized gas such as air so that it is laid in position ensures that the friction to insertion of the optical fiber unit into the polymer pipe is reduced by incorporating either a lubricant or an antistatic agent or both in either the optical fiber unit or the polymer pipe or both. This arrangement is effective in improving the blowing characteristics, i.e. blowing distance and time, of the optical fiber unit.

More particularly, if a solid lubricant is used, the blowing characteristics of the optical fiber unit can be thermally stabilized against variations with time. This improved stability in thermal characteristics will offer great benefits in areas such as where the optical fiber cable of the present invention is used for a prolonged period as a composite cable in which it is combined with a power cable and its overall temperature will exceed 70° C. in an energized state.

Further, since the blowing characteristics that is blowing distance and speed are thus improved according to the present invention, the optical cable can be applied to so-called a non-splice cable laying method in which one elongated body such as a long optical fiber unit is confined, at one operation, within an elongated hole such as a long pipe by blowing with a pressurized gas, without any connection.

Although the above embodiment describes with respect to an optical fiber and a polymer pipe, the invention is not limited thereto or thereby. That is, the invention may be applied to any other system including an elongated body and an elongated hole within which the elongated body is confined by blowing with a pressurized gas.

What is claimed is:

1. A pressure transporting system, comprising:
   at least one optical fiber unit;
   a pipe within which said at least one optical fiber unit can be transported by blowing with a pressurized gas; and
   means reducing friction between said at least one optical fiber unit and said pipe, said friction reducing means being provided on at least one of said at least one optical fiber unit and said pipe, said friction reducing means comprising an organic lubricant.

2. A pressure tranporting system, comprising:
   at least one optical fiber unit;
   a pipe within which said at least one optical fiber unit can be transported by blowing with a pressurized gas; and
   means for reducing friction between said at least one optical fiber unit and said pipe, said friction reducing means being provided on at least one of said at least one optical fiber unit and said pipe, said friction reducing means comprising a fluorine resin based solid lubricant.

3. The system of claim 2, wherein said pipe is formed of polymer.

4. The system of claim 2, wherein said optical fiber unit comprises one or plural optical fibers wrapped with a filled layer and a foamed coating layer.

5. The system of claim 4, wherein each of said optical fibers is coated with a UV curable urethane acrylate polymer, said filled layer is Nylon-12, and said foamed coating layer is an about 50% foamed low density polyethylene layer.

6. The system of claim 2, wherein said friction reducing means comprises a lubricant.

7. The system of claim 6, wherein said lubricant is provided on said optical fiber unit.

8. The system of claim 2, wherein said lubricant is provided on said pipe.

9. The system of claim 2, wherein said lubricant is provided both on said optical fiber unit and said pipe.

10. A pressure transporting system, comprising:
    at least one optical fiber unit;
    a pipe within which said at least one optical fiber unit can be transported by blowing with a pressurized gas; and
    means for reducing friction between said at least one optical fiber unit and said pipe, said friction reducing means being provided on at least one of said at least one optical fiber unit and said pipe, said friction reducing means comprising a lubricant and an antistatic agent.

11. The system of claim 10, wherein said lubricant is a fluorine resin based solid lubricant.

12. The system of claim 10, wherein said lubricant is an organic lubricant.

13. The system of claim 10, wherein said lubricant is an inorganic solid lubricant.

14. The system of claim 10, wherein both said lubricant and said antistatic agent are provided on said optical fiber unit.

15. The system of claim 10, wherein both said lubricant and said antistatic agent are provided on said pipe.

16. The system of claim 10, wherein both said lubricant and said antistatic agent are provided both on said optical fiber unit and said pipe.

17. The system of claim 2, wherein said solid lubricant is polytetrafluoroethylene (PTFE) powder.

18. The system of claim 1 or 12, wherein said organic lubricant is a silicone based plastic additives.

19. The system of claim 1 or 12, wherein said lubricant is a fatty acid ester.

20. The system of claim 19, wherein said lubricant is a butyl stearate.

21. The system of claim 19, wherein said lubricant is an ethylene glycol monostearate.

22. The system of claim 1 or 12, wherein said lubricant is a metallic soap.

23. The system of claim 22, wherein said metallic soap is a lead stearate.

24. The system of claim 1 or 12, wherein said lubricant is a fatty acid.

25. The system of claim 24, wherein said fatty acid is stearic acid.

26. The system of claim 1 or 12, wherein said lubricant is an aliphatic amide.

27. The system of claim 26, wherein said aliphatic amide is oleamide.

28. The system of claim 26, wherein said aliphatic amide is elucamide.

29. The system of claim 26, wherein said aliphatic amide is stearamide.

30. A pressure transporting system, comprising:
   at least one optical fiber unit;
   a pipe within which said at least one optical fiber unit can be transported by blowing with a pressurized gas; and
   means for reducing friction between said at least one optical fiber unit and said pipe, said friction reducing means being provided on at least one of said at least one optical fiber unit and said pipe, said friction reducing means comprising an inorganic solid lubricant.

31. The system of claim 30 or 13, wherein said solid lubricant is a talc.

32. The system of claim 30 or 13, wherein said solid lubricant is a carbon.

33. The system of claim 30 or 13, wherein said solid lubricant is a boron nitride.

34. The system of claim 30 or 17, wherein said solid lubricant is molybdenum disulfide.

35. a pressure transporting system, comprising:
   at least one optical fiber unit;
   a pipe within which said at least one optical fiber unit can be transported by blowing with a pressurized gas; and
   means for reducing friction between said at least one optical fiber unit and said pipe, said friction reducing means being provided on at least one of said at least one optical fiber unit and said pipe, said friction reducing means comprising and antistatic agent.

36. The system of claim 35, wherein said antistatic agent is provided on said optical fiber unit.

37. The system of claim 35, wherein said antistatic agent is provided on said pipe.

38. The system of claim 35, wherein said antistatic agent is provided both on said optical fiber unit and said pipe.

39. The system of claim 35 or 10, wherein said antistatic agent comprises an organic material.

40. The system of claim 39, wherein said antistatic agent is based on siloxanes.

41. The system of claim 39, wherein said antistatic agent is based on surfactants.

42. The system of claim 41, wherein said surfactants is a non-ionic polyhydric alcohol fatty acid esters.

43. The system of claim 41, wherein said surfactants is a glycerol aliphatic acid esters.

44. An optical fiber cable, comprising:
   an optical fiber unit comprising one or more optical fibers, a filled layer surrounding said optical fiber, and a foamed coating layer surrounding said filled layer;
   a pipe formed of polymer, within which said optical fiber unit is confined and transported by blowing with a pressurized gas; and
   means for reducing friction between said optical fiber unit and said pipe, said friction reducing means being provided on at least one of said optical fiber unit and said pipe, said friction reducing means comprising a lubricant and an antistatic agent.

* * * * *